United States Patent [19]

Pillar et al.

[11] 3,819,547

[45] June 25, 1974

[54] SELF-EXTINGUISHING POLYMER COMPOSITIONS CONTAINING HEXABROMO-2-BUTENE

[75] Inventors: Walter O. Pillar, Monroeville; Robert A. Sutton, Coraopolis, both of Pa.

[73] Assignee: Arco Polymers, Inc., Pittsburgh, Pa.

[22] Filed: July 9, 1973

[21] Appl. No.: 377,705

[52] U.S. Cl......... 260/2.5 FP, 260/2.5 B, 260/47 R, 260/654 R, 260/DIG. 24
[51] Int. Cl............................ C07c 21/02, C08f 1/26
[58] Field of Search ..... 260/2.5 FP, 2.5 B, DIG. 24, 260/47 R

[56] References Cited
UNITED STATES PATENTS
2,658,877  11/1953  Dreisbach .................... 260/2.5 FP
3,058,926  10/1962  Eichhorn ...................... 260/2.5 FP Primary Examiner—Murray Tillman
Assistant Examiner—Morton Foelak
Attorney, Agent, or Firm—Dr. Lewis J. Young

[57] ABSTRACT

Expandable styrene polymer compositions are made self-extinguishing by incorporating from 0.2 to 10 percent by weight of hexabromo-2-butene, with or without a peroxide synergist, into the polymer. The preferred method of incorporation comprises adding the hexabromobutene during impregnation of the polymer particles with a blowing agent to produce expandable, self-extinguishing polymer particles.

11 Claims, No Drawings 3,819,547

SELF-EXTINGUISHING POLYMER COMPOSITIONS CONTAINING HEXABROMO-2-BUTENE

BACKGROUND OF THE INVENTION

This invention relates to a self-extinguishing, expandable styrene polymer composition containing hexabromo-2-butene and a process for incorporating the hexabromobutene into the styrene polymers.

Polymer foams are so light in weight and have such good heat insulating qualities that their use in building construction is highly desirable. A prerequisite for such use is that the foam must have fire-retardant properties. Many brominated organic compounds have been proposed as additives for this purpose. While these compounds have been effective to render the polymer composition self-extinguishing, when used in amounts sufficient to give the desired degree of fire-retardancy the compounds adversely effect the molding properties of the polymers. For example, in molding expandable styrene polymer particles containing self-extinguishing agents, it is found that the presence of the self-extinguishing agents causes poor fusion of the particles and shrinkage of the polymer foam. This is especially true when the brominated compounds are either liquids or low-melting solids (i.e., melting points below 120° C.) and therefore the compounds act to plasticize the polymer to such an extent that the molding properties deteriorate. Higher melting compounds have been proposed, such as those of U.S. Pat. Nos. 3,511,796 and 3,576,771. However, these higher melting agents are often difficult to uniformly disperse throughout the foam and, hence, give rise to inconsistent flammability tests. Solid compounds also reduce the expandability potential making it difficult to obtain foam of 1 pound per cubic foot density.

SUMMARY OF THE INVENTION

We have now found that expandable styrene polymer compositions can be rendered self-extinguishing by the addition of from 0.2 to 10.0 percent by weight of hexabromo-2-butene, a solid melting at about 191° C. A process has been developed for uniformly incorporating the bromo-compound onto the expandable polymer particles by forming an aqueous dispersion of the polymer particles, the bromo-compound, and a peroxide, if used, and impregnating the particles with an organic blowing agent. The impregnation is preferably carried out at a temperature below 100° C.

DETAILED DESCRIPTION OF THE INVENTION

The hexabromo-2-butene useful in the invention is predominantly trans-1,1,2,3,4,4-hexabromo-2-butene, made by bromination of diacetylene. The product used in the examples was a white, crystalline solid, melting point 191° C, sold by Tenneco Chemical, Inc., of Pasadena, Texas. The cis-form of hexabromo-2-butene is reported to melt at 114° C, but a certain amount of this isomer may be included in the commercial product without affecting the fire-retardant properties of the polymers.

In accordance with the invention, a variety of expandable thermoplastic homopolymers and copolymers can be rendered self-extinguishing. The polymers may be derived from vinyl aromatic monomers, such as styrene, vinyltoluene, isopropylstyrene, alpha-methylstyrene, chlorostyrenes, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrite and maleic anhydride. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Suitable agents include aliphatic hydrocarbons containing from 1–7 carbon atoms in the molecule, such as methane, ethane, propane, butane, pentane, cyclopentane, hexane, heptane, cyclohexane, and their halogenated derivative which boil at a temperature below the softening point of the polymer. Preferred agents for the present invention are mixtures of these, such as a 20/40/40 mixture of cyclopentane/isopentane/n-pentane, or a 55/45 mixture of trichlorofluoromethane/n-pentane. Usually from 3 to 20 percent of blowing agent per 100 parts of polymer is incorporated by the impregnation.

The impregnation is conventionally carried out at temperatures ranging from about 60° to 150° C. However, because of the presence of the hexabromobutene during the impregnation of the present invention, a temperature between 80° to 100° C is preferred.

In the process of the invention, styrene polymer particles are suspended in water with the aid of a difficultly-water-soluble suspending agent, such as tricalcium phosphate and an anionic surfactant extender. To the suspension is added from 0.2 to 10 percent by weight, based on polymer, of the hexabromo-2-butene and from 3.0 to 20 percent by weight of the blowing agent. If used, 0.2 to 2.0 percent by weight of an organic peroxide synergist is also added at this point. The suspension is then heated to a temperature, preferably between 80° and 100° C. for 6 to 15 hours to impregnate the polymer particles and uniformly disperse the hexabromobutene throughout the polymer. After the impregnation is complete, the particles are cooled to room temperature, acidified with hydrochloric acid, separated from the aqueous medium, and washed with water. The particles are then dried to produce expandable particles which when molded produce self-extinguishing foamed articles.

Depending upon the end use, foamed articles containing larger amounts of hexabromo-2-butene, such as amounts greater than 3.0 parts per 100 parts of polymer, are self-extinguishing without the aid of synergistic amounts of organic peroxides. With lesser amounts of the bromo-compound, it is preferred to use from 0.1 to 2.0 parts per 100 parts of polymer of an organic peroxide to aid in the decomposition of the bromo-compound when burned.

Suitable for the synergistic-action are those organic peroxides which decompose at temperatures above 100° C. This limitation is necessary to prevent premature decomposition of the peroxide during the impregnation step. Useful examples are dicumyl peroxide, 2,5-dimethyl-2,5-di(tert-butylperoxy) hexane, 1,3-bis(α-tert-butylperoxyisopropyl)benzene, di(3-tert-butylperoxy-1,3-dimethylbutyl) carbonate, and 2,5-dimethyl-2,5-di(tert-butylperoxy)-3-hexyne.

The invention is further illustrated by the following examples, wherein parts are parts by weight unless otherwise indicated.

in the UL-94 test and had no flaming drips out of 4 or 5 specimens each. The sample containing 0.2 g. hexabromobutene per 100g. polymer extinguished itself in the vertical burn test, but the time should have been less than 1 second to be considered acceptable.

Samples prepared as above, but containing 0.4, 0.6, and 0.8g. of hexabromobutene in combination with 0.35g. of 1,3-bis(α-tert-butylperoxyisopropyl)benzene, were also prepared and tested with similar results.

TABLE I

| Bottle No. | 1 | 2 | 3 | 4 | 5 | 6 | 7 | 8 |
|---|---|---|---|---|---|---|---|---|
| Hexabromo-2-butene, g. | 0 | 0.2 | 0.4 | 0.6 | 0.8 | 1.0 | 2.5 | 5.0 |
| Evaluation | | | | | | | | |
| Vertical SE time, sec. | Burns | 3.0 | 0.6 | 0.3 | 0.25 | 0.1 | 0.1 | 0.1 |
| UL-94 | | | | | | | | |
| inches burned | 5.5 | 1.1 | 1.5 | 1.6 | 1.5 | 1.6 | 1.6 | 1.6 |
| No. of flaming drips | 4/4 | 0/4 | 0/4 | 0/4 | 0/4 | 0/4 | 0/5 | 0/5 |

EXAMPLE I

To a series of 12-oz. crown capped bottles was added 100g. water, 2.0g. tricalcium phosphate, 0.05g. sodium dodecylbenzenesulfonate, 100g. polystryene particles having a particle size of predominantly through 16 and on 30 mesh, U.S. Standard Sieve, the amounts of hexabromo-2-butene shown in Table I, 0.45g. of 2,5-dimethyl-2,5-di(tert-butylperoxy)hexane, and 8.5g. of a 20/40/40 mixture of cyclo-/iso-/n-pentane. The bottles were capped and heated at 90° C. for 12 hours with end-over-end agitation. The bottles were cooled to room temperature and opened. The polymer particles were separated, acidified with dilute hydrochloric acid, washed with water, and dried.

The samples were heated with a steam for 2 minutes to form pre-expanded particles of density slightly under 1.0 pound per cubic foot. These preexpanded particles were then molded for 1 minute at 120°C to form a 5½" × 5½" × ½" plaques having densities of between 1.5 and 2.0 pound per cubic foot. A specimen 1" × 5" × ½" was hung lengthwise from a clamp over a microburner having a ¾" yellow flame. The flame was positioned ¾" from the bottom edge of the foam sample for 3 seconds. The length of time the test sample burned after the flame was removed is shown in Table I as Vertical SE time.

The samples were also subjected to flammability tests conducted with the samples in a horizontal position according to UL-94 (Underwriters Laboratories test for classifying foamed materials). In the UL-94 test, specimens 6" × 2" × ½" are placed flat on a wire cloth positioned ½" above a burner tip and 12" above a horizontal layer of dry absorbent surgical cotton. The flame is applied at one end of the specimen for 1 minute and removed. The results are shown in Table I as "inches burned" and "number of flaming drips."

The sample without hexabromobutene burned completely in both the vertical and UL-94 tests. All samples containing hexabromobutene burned less than 2 inches

EXAMPLE II

The method of Example I was repeated, omitting the peroxide synergist and using 1, 3, 5, and 10 g. of hexabromobutene per 100 g. of polystyrene. The samples were pre-expanded, molded, and tested as in Example I. The results were as follows:

Table II

| Hexabromobutene, g. | 1 | 3 | 5 | 10 |
|---|---|---|---|---|
| Vertical SE time, sec. | 10 | 3.6 | 1.3 | 0.5 |
| UL-94 | | | | |
| inches burned | 1.3 | 1.3 | 1.2 | 1.4 |
| No. of flaming drips | 1/5 | 2/5 | 1/5 | 1/5 |

The results indicated that although some self-extinguishing properties are obtained without peroxide, the use of peroxide is desirable for concentration of hexabromobutene less than about 3% by weight.

EXAMPLE III

To study the effect of foam density on the self-extinguishing properties of the moldings, four series of samples were prepared using the process of Example I as follows: A contained 0.5 parts of hexabromo-2-butene per 100 parts of polystyrene with 8.5 parts of a 20/40/40 mixture of cyclo-/iso-/n-pentane blowing agent; B contained 0.5 parts of hexabromo-2-butene per 100 parts of polystyrene with 8.5 parts of a 70/30 mixture of iso-/n-pentane blowing agent; C contained 0.7 parts of hexabromo-2-butene per 100 parts of polystyrene with 8.5 parts of a 20/40/40 mixture of cyclo-/iso-/n-pentane blowing agent; and D contained 0.7 parts of hexabromo-2-butene per 100 parts of polystyrene with 8.5 parts of a 70/30 mixture of iso-/n-pentane blowing agent. The samples were molded at 120° C. for 1-3 minutes into 5½" × 5½" × ½" plaques of varying densities as shown in the Table III and tested as in Example I.

Table III

| Sample | p.c.f. Mold Density | UL-94 burn – Drips inches time, seconds | Vertical SE |
|---|---|---|---|
| A | 1.5 | 1.4 – 0/4 | 0.3 |
| A | 3.0 | 1.5 – 1/4 | 0.7 |
| A | 5.0 | 1.3 – 3/4 | 0.4 |
| A | 7.0 | 1.0 – 3/4 | 0.4 |
| B | 1.7 | 1.4 – 1/4 | 1.0 |
| B | 3.0 | 1.4 – 1/4 | 0.3 |
| B | 5.0 | 1.2 – 0/4 | 0.5 |
| B | 7.0 | 1.1 – 2/4 | 0.3 |
| C | 1.6 | 1.5 – 1/4 | 0.5 |
| C | 3.0 | 1.1 – 0/4 | 0.4 |
| C | 5.0 | 1.3 – 3/4 | 0.3 |
| C | 7.0 | 1.0 – 0/4 | 0.2 |
| D | 1.7 | 1.5 – 0/4 | 0.8 |
| D | 3.0 | 1.3 – 1/4 | 1.1 |
| D | 5.0 | 1/3 – 0/4 | 0.1 |
| D | 7.0 | 1.0 – 1/4 | 0.1 |

The vertical SE times were all acceptable, however the flaming drip test by UL-94 were somewhat erratic. In high density foams, especially those of greater than 5 p.c.f., concentrations of hexabromo-2-butene greater than 0.5% would improve the drip resistance.

EXAMPLE IV

To a 100 gallon reactor was added 100 parts of water, 2.0 parts of tricalcium phosphate, 0.025 part of sodium dodecylbenzenesulfonate, 100 parts of polystyrene particles having a particle size of predominantly through 16 and on 30 mesh, U.S. Standard Sieve, and 0.6 part of 1,1,2,3,4,4-hexabromo-2-butene. The reactor was heated to 80° C over a period of a half hour. A mixture of 0.45 part of 1,3-bis($\alpha$-tert-butylperoxyisopropyl)benzene, 6.6 parts of trichlorofluoromethane and 5.4 parts of n-pentane was added continuously over 2 hours. The reactor was maintained at 80° C for 8 hours and then cooled to 25° C. The polymer particles were separated from the aqueous medium by centrifuge, acidified with hydrochloric acid, washed with water, and dried. The final particles contained hexabromobutene, peroxide, and about 9.6% by weight of the 55/45 mixture of blowing agent. After preexpansion of the particles to 1.0 p.c.f. density, they were molded to foams of about 1.3 p.c.f. density and tested by the vertical SE and UL-94 tests described in Example I. The specimens extinguished in 0.1 seconds in the Vertical SE test and burned 1.5 inches with no flaming drips in the UL-94 test. Billets, 25" × 98" × 18", molded from these particles had good fusion (85%), and low shrinkage and low collapse of the billet from the mold on cooling.

Samples prepared by the above process using a liquid bromine compound, tris(2,3-dibromopropyl) phosphate, were molded into comparable billets but had considerably greater shrinkage and collapse of the molded dimensions.

What is claimed is:

1. A self-extinguishing, expandable styrene polymer composition comprising a styrene polymer, 0.2 to 10 percent by weight of hexabromo-2-butene, and 3 to 20 percent by weight of an organic blowing agent.

2. The composition of claim 1 wherein the hexabromo-2-butene is predominantly trans-1,1,2,3,4,4-hexabromo-2-butene.

3. The composition of claim 1 including 0.1 to 2.0 percent by weight of an organic peroxide synergist.

4. The composition of claim 3 wherein said styrene polymer is polystyrene and said blowing agent is a mixture of 20 percent of cyclopentane, 40 percent of isopentane, and 40 percent of n-pentane.

5. The composition of claim 3 wherein said blowing agent is a mixture of 50–60 percent of trichlorofluoromethane and 40–50 percent of n-pentane.

6. Self-extinguishing, foamed articles prepared by molding the composition of claim 1.

7. Self-extinguishing, foamed articles prepared by molding the composition of claim 3.

8. A process for the preparation of expandable, self-extinguishing styrene polymer compositions comprising:
   a. forming an aqueous suspension of 100 parts of styrene polymer particles in 100–200 parts of water with the acid of a suspending agent which may be extended by a surfactant;
   b. adding to the suspension from 0.2 to 10 parts of hexabromo-2-butene and 3 to 20 parts of an organic blowing agent;
   c. heating the suspension at a temperature of 80°–100° C. for 6–20 hours to impregnate the polymer particles; and
   d. separating the impregnated polymer particles from the aqueous medium.

9. The process of claim 8 including the step of adding 0.1 to 2.0 parts of an organic peroxide synergist with the hexabromo-2-butene.

10. The process of claim 9 wherein the organic blowing agent is a mixture of 20 percent cyclopentane, 40 percent isopentane, and 40 percent n-pentane.

11. The process of claim 9 wherein the organic blowing agent is a mixture of 50–60 percent trichlorofluoromethane and 40–50 percent n-pentane.

* * * * *

Notice of Adverse Decision in Interference

In Interference No. 99,327, involving Patent No. 3,819,547, W. O. Pillar and R. A. Sutton, SELF-EXTINGUISHING POLYMER COMPOSITIONS CONTAINING HEXABROMO-2-BUTENE, final judgment adverse to the patentees was rendered Feb. 13, 1980, as to claim 6.

[*Official Gazette July 22, 1980.*]

Disclaimer 3,819,547.—*Walter O. Pillar*, Monroeville, and *Robert A. Sutton*, Coraopolis, Pa. SELF-EXTINGUISHING POLYMER COMPOSITIONS CONTAINING HEXABROMO-2-BUTENE. Patent dated June 25, 1974. Disclaimer filed Oct. 12, 1982, by the assignee, *Atlantic Richfield Co.*

Hereby enters this disclaimer to claims 1, 2, 3, 4, 5, 6 and 7 of said patent.
[*Official Gazette December 21, 1982.*]